United States Patent
Rinaldi et al.

(10) Patent No.: US 11,042,636 B2
(45) Date of Patent: Jun. 22, 2021

(54) USING TRAP STORAGE UNITS TO DETECT MALICIOUS PROCESSES

(71) Applicant: International Business Machines Corporation, Armonk, NY (US)

(72) Inventors: Brian A. Rinaldi, Tucson, AZ (US); Clint A. Hardy, Tucson, AZ (US); Lokesh M. Gupta, Tuscon, AZ (US); Kevin J. Ash, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 352 days.

(21) Appl. No.: 16/129,608

(22) Filed: Sep. 12, 2018

(65) Prior Publication Data
US 2020/0082075 A1 Mar. 12, 2020

(51) Int. Cl.
*G06F 21/00* (2013.01)
*G06F 21/56* (2013.01)
*G06F 12/14* (2006.01)

(52) U.S. Cl.
CPC .......... *G06F 21/56* (2013.01); *G06F 12/1458* (2013.01); *G06F 2212/1052* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,032,114 B1* | 4/2006 | Moran | G06F 21/554 713/176 |
| 7,065,657 B1* | 6/2006 | Moran | G06F 21/552 726/5 |
| 8,413,241 B2 | 4/2013 | Weeks et al. | |
| 9,485,276 B2 | 11/2016 | Quinlan et al. | |
| 10,609,066 B1* | 3/2020 | Nossik | H04L 63/1408 |
| 2003/0172293 A1 | 9/2003 | Johnson et al. | |
| 2012/0066765 A1* | 3/2012 | O'Brien | H04L 63/102 726/23 |
| 2012/0254995 A1* | 10/2012 | Sallam | G06F 21/566 726/22 |
| 2012/0255010 A1* | 10/2012 | Sallam | H04L 63/1408 726/24 |

(Continued)

OTHER PUBLICATIONS

Kumar, Sanjeev et al. Hybrid honeypot framework for malware collection and analysis. 2012 IEEE 7th International Conference on Industrial and Information Systems (ICIIS). https://ieeexplore.ieee.org/stamp/stamp.jsp?tp=&arnumber=6304786 (Year: 2012).*

(Continued)

*Primary Examiner* — Jeremiah L Avery
(74) *Attorney, Agent, or Firm* — Konrad, Raynes, Davda and Victor LLP; David W. Victor; Alan S. Raynes (57) ABSTRACT

Provided are a computer program product, system, and method for detecting potentially malicious code in a host system accessing data from a storage. A trap storage unit is configured for data in the storage and the trap storage unit is indicated as a trap. Storage units are configured for data in the storage that are not indicated as a trap. A request is received to access the trap storage unit from a process executing in a host system. Notification is returned to the host system that the process requesting to access the trap storage unit is a potentially malicious process.

25 Claims, 7 Drawing Sheets

(56) References Cited

U.S. PATENT DOCUMENTS

| | | | | |
|---|---|---|---|---|
| 2013/0132690 | A1* | 5/2013 | Epstein | G06F 11/1451 711/159 |
| 2013/0198474 | A1* | 8/2013 | Shaath | G06F 12/1466 711/163 |
| 2014/0115652 | A1* | 4/2014 | Kapoor | G06F 21/567 726/1 |
| 2015/0370496 | A1 | 12/2015 | Stevens | |
| 2016/0012222 | A1* | 1/2016 | Stolfo | G06F 21/554 726/23 |
| 2016/0371496 | A1* | 12/2016 | Sell | G06F 9/45558 |
| 2017/0324755 | A1* | 11/2017 | Dekel | G06F 21/60 |
| 2018/0075236 | A1* | 3/2018 | Kwon | G06F 21/554 |
| 2018/0121650 | A1 | 5/2018 | Brown | |
| 2018/0262529 | A1* | 9/2018 | Allen | H04L 63/061 |
| 2018/0322280 | A1 | 11/2018 | Borlick et al. | |
| 2019/0080082 | A1 | 3/2019 | Desai et al. | |
| 2019/0121571 | A1* | 4/2019 | Wahla | G06F 3/0622 |
| 2019/0318094 | A1 | 10/2019 | Sun et al. | |

OTHER PUBLICATIONS

Bombardieri, Michele et al. Honeypot-Powered Malware Reverse Engineering. 2016 IEEE International Conference on Cloud Engineering Workshop (IC2EW). https://ieeexplore.ieee.org/stamp/stamp.jsp?tp=&arnumber=7527817 (Year: 2016).*

Paul, Sounak; Mishra, Bimal Kumar. Honeypot based signature generation for defense against polymorphic worm attacks in networks. 2013 3rd IEEE International Advance Computing Conference (IACC). https://ieeexplore.ieee.org/stamp/stamp.jsp?tp=&arnumber=6514213 (Year: 2013).*

Whitham, Ben, "Canary Files: Generating Fake Files to Detect Critical Data Loss from Complex Computer Networks," The Second International Conference on Cyber Security, Cyber Peacefare and Digital Forensic (CyberSec2013), pp. 170-179. The Society of Digital Information and Wireless Communication, 2013.

U.S. Appl. No. 16/129,616, filed Sep. 12, 2018, invented by Brian A. Rinaldi et al., Total 34 pages.

U.S. Appl. No. 15/954,334, filed Apr. 16, 2018, invented by Matthew G. Borlick et al., Total 32 pages.

U.S. Appl. No. 15/456,095, filed Mar. 10, 2017, invented by Peter G. Sutton et al., Total 33 pages.

US Patent Application, for U.S. Appl. No. 15/954,341, filed Apr. 16, 2018, invented by Matthew G. Borlick et al., Total 41 pages.

List of Related Patents, dated Sep. 12, 2018, Total 2 pages.

Office Action, dated Jun. 11, 2020, for U.S. Appl. No. 16/129,616, filed Sep. 12, 2018, invented by Brian A. Rinaldi et al., Total 12 pages.

Response to Office Action, dated Sep. 11, 2020, for U.S. Appl. No. 16/129,616, filed Sep. 12, 2018, invented by Brian A. Rinaldi et al., Total 12 pages.

Notice of Allowance, dated Nov. 4, 2020, for U.S. Appl. No. 16/129,616, filed Sep. 12, 2018, invented by Brian A. Rinaldi et al., Total 5 pages.

* cited by examiner

USING TRAP STORAGE UNITS TO DETECT MALICIOUS PROCESSES

BACKGROUND OF THE INVENTION

1. Field of the Invention

The present invention relates to a computer program product, system, and method for using trap storage units to detect malicious processes.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software. One type of malicious software known as ransomware encrypts user data, and then the operator of the ransomware blackmails the victim of the attack requiring payment for the encryption key to use to decrypt their data.

Malicious code may try to randomly access data configured in storage and memory by reading from the storage and memory to try to read sensitive information stored in the memory and storage.

There is a need in the art for improved techniques for detecting malicious code attempting to access protected data stored in cache to prevent malevolent activity and compromising data.

SUMMARY

Provided are a computer program product, system, and method for detecting potentially malicious code in a host system accessing data from a storage. A trap storage unit is configured for data in the storage and the trap storage unit is indicated as a trap. Storage units are configured for data in the storage that are not indicated as a trap. A request is received to access the trap storage unit from a process executing in a host system. Notification is returned to the host system that the process requesting to access the trap storage unit is a potentially malicious process.

With the above embodiment, trap storage units are configured to catch malicious processing trying to read data. A trap storage unit would not be accessed by a legitimate process in a host system because legitimate processes would only access storage units or volumes allocated through the host system, not storage units configured by the storage controller to function as trap storage units.

In a further embodiment, the computer program product is implemented in a storage controller managing access to the storage. The trap storage unit is created by a process in the storage controller and not in response to a request for a storage unit from one of the host systems.

With the above embodiment, the trap storage unit would not be accessed by a legitimate process in a host system, because it is created by a storage controller and not in response to a request from one of the host systems to configure a storage unit or volume for applications in the host systems to use. The applications in a host system would only use storage allocated and provided by the host system obtaining volumes to use from the storage controller.

In a further embodiment, the trap storage unit is not provisioned storage space in the storage.

With the above embodiment, the trap storage unit is not provisioned storage space to preserve storage space for allocation to storage units requested by the host system to use for applications.

In a further embodiment, a request is received to access the trap storage unit that is not potentially malicious. The trap unit accessed in a manner that is not potentially malicious is indicated as not trap.

With the above embodiment, if a legitimate process seeks to access or use trap storage to extend current allocated storage, the trap unit is indicated as not a trap to allocate without delay to legitimate processes running in the host system.

In a further embodiment, a new trap storage is configured and indication is made that the new trap storage unit is a trap in response to the request to the trap storage unit that is not potentially malicious.

With the above embodiment, trap storages are added as others are allocated to legitimate host processes, to maintain the trap to non-trap ratio to ensure a consistent level to detect malicious access In a further embodiment, the storage units comprise extents, wherein each extent identifies a range of tracks to assign to volumes, wherein the trap storage unit comprises a trap extent allocated to a volume and indicated as a trap extent in extent metadata for the trap extent. A rite to the trap extent is received from a host. The trap extent is allocated for the to use. Further, a trap extent is configured and indicated as a trap extent. The trap extent is allocated to the volume for the host to use by indicating the trap extent as not trap. A new trap extent is configured in the volume and indicating the new trap extent as trap in extent metadata for the new trap extent.

With the above embodiment, a valid volume is configured by the host system for use by legitimate applications, and within these application volumes are trap extents used to catch malicious code attempting to read parts of a volume known to be accessed by applications accessing sensitive and private information.

In a further embodiment, a request to access the trap extent that causes returning notification that the process requesting to access the trap extent is a potentially malicious process comprises a read request.

With the above embodiment, legitimate code running in the host may attempt to write to a trap extent if there is no more space in the volume. However legitimate code would not try to read from a trap extent because it has not yet been provisioned by the host system to provide to its running applications. Thus, only malicious programs try to read as much data as possible without regard to it being properly allocated so would tend to read the trap extents.

In a further embodiment, the storage units comprise extents comprising a range of tracks to assign to volumes created for host systems, wherein the trap storage unit comprises a trap extent allocated to a volume and indicated as trap extent in extent metadata for the trap extent. A plurality of trap extents are created to allocate to a volume. Indication is made in extent metadata for the created trap extents that the created trap extents are a trap.

Further provided are a computer program product, system, and method for detecting potentially malicious code accessing data from a storage and in communication with host systems. A trap volume is configured in the storage and indicated as a trap volume. Volumes are configured in the storage that are not indicated as trap volumes. A request is received to access the trap volume from a process executing in a host system. Notification is returned to the host system of the process requesting to access the trap volume as a potentially malicious process.

In a further embodiment, the trap volume is assigned a volume address. Volume addresses are randomly determined. Trap volumes are created at the randomly determined volume addresses and indicating the trap volumes as trap in volume metadata.

With the above embodiments, random addresses are selected for the trap volumes so that malicious programs or hackers cannot easily determine whether there are specific addresses predetermined to use for trap volumes to avoid or manipulate.

In a further embodiment, the trap volume is assigned a volume address. A request is received from a host to create a new volume at a requested volume address assigned to a trap volume. The trap volume assigned to the requested volume address is indicated as not trap in volume metadata for the trap volume rendering the trap volume a new volume that is not trap. Storage space is provisioned to the new volume. Indication is returned to the request from the host that the new volume at the requested volume address is configured for use.

With the above embodiment, a host system may attempt to request to create a volume at a volume addressed the storage controller has used for a trap volume. To avoid delays and latency in configuring a volume for the host request, the storage controller may convert the trap volume to a legitimate volume for use by the host system. a host system may In a further embodiment, a new trap volume is configured at an available volume address in the storage and the new trap volume is indicated as a trap volume in volume metadata for the new trap volume.

With the above embodiment, when converting a trap volume to a volume for use by a host system, the storage controller may further create a replacement trap volume to maintain a constant number or ratio of trap volumes to provide the same level of traps or ability to detect malicious code.

DETAILED DESCRIPTION

Currently, a storage controller cannot detect a malicious intrusion based on data accessed. Described embodiments address this problem by configuring trap storage units for data in the storage, such as, but not limited to, trap volumes and trap extents in non-trap volumes. The storage unit may be indicated as a trap in metadata for the storage unit. Upon receiving a request from a process in a host system or in the storage controller to a trap storage unit, a presumption may be made that the request is malicious and notification may be returned to the host system identifying the process requesting to access the trap storage as a potentially malicious process. In this way, trap storage units configured in the storage controller are used to lure and trap malicious processes.

Figure 1:
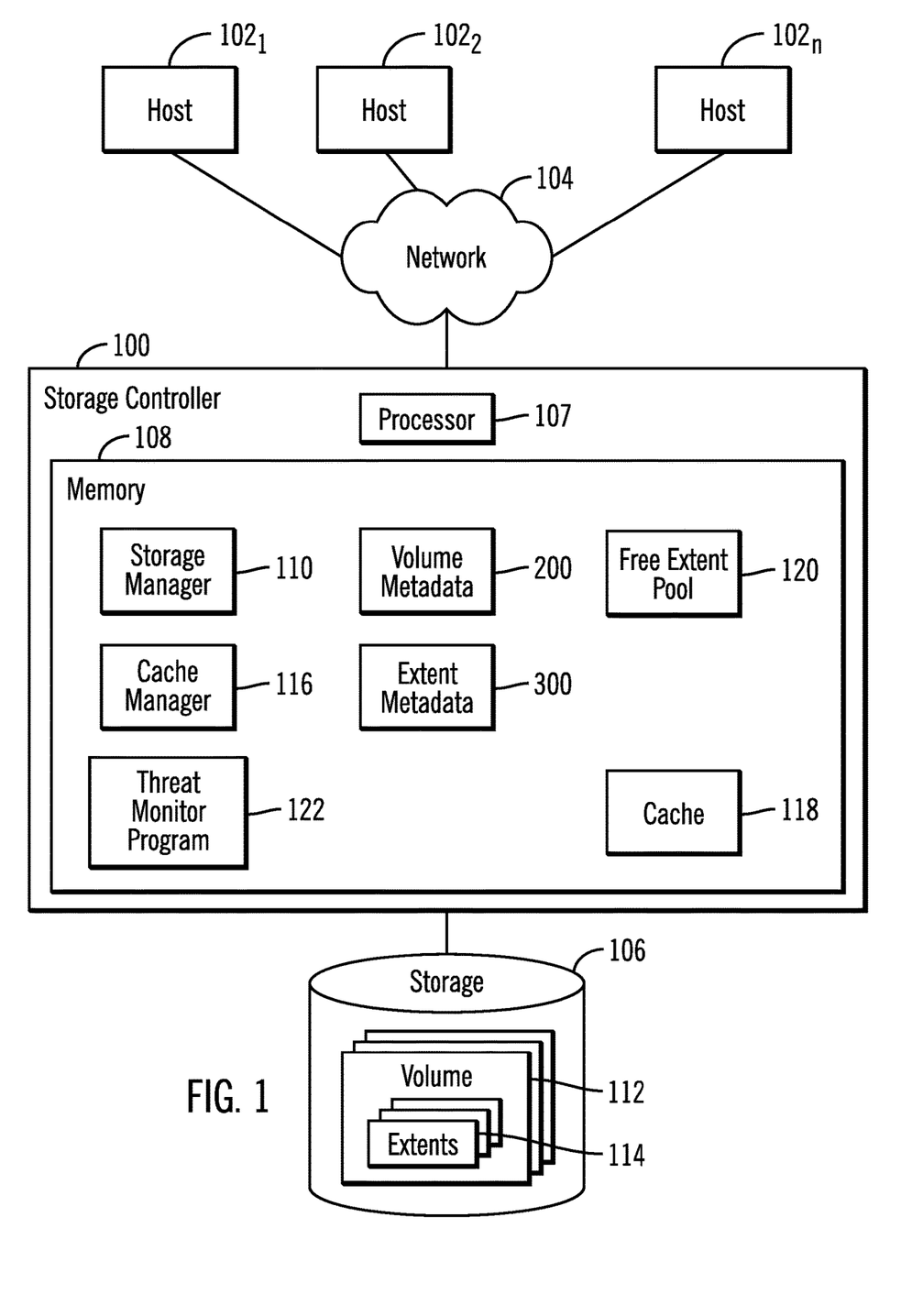
FIG. 1 illustrates an embodiment of a storage environment.

FIG. 1 illustrates an embodiment of a storage environment including a storage controller 100 in communication with host systems $102_1, 102_2 \ldots 102_n$ over a network 104 to receive Input/Output (I/O) requests to a storage 106. The storage controller 100 includes a processor 107 and a memory 108. The processor 102 may comprise a separate central processing unit (CPU), one or a group of multiple cores on a single CPU, or a group of processing resources on one or more CPUs.

The memory 108 includes a storage manager 110 to manage I/O requests from the host systems $102_1, 102_2 \ldots 102_n$ to the storage 106 and to configure and manage volumes 112 comprised of extents 114 of tracks in the storage 106. A track comprises any addressable storage unit representing data in storage and memory, also referred to as a block, logical address, logical block address (LBA), physical block address, etc. A cache manager 116 manages caching of tracks from the volumes 112 in a cache 118 portion of the memory 108 subject to read and write requests from the host systems $102_1, 102_2 \ldots 102_n$. The storage manager 110 maintains in the memory 108 volume metadata 200 having information on volumes 112 configured in the storage 106 and extent metadata 300 on extents 114 of tracks allocated to volumes 112 or in a free extent pool 120. The cache manager 116 maintains a cache control block directory in the memory 108 of cache control blocks, where there is one cache control block for each cache segment in the cache 118 providing metadata on and providing a realization of the cache segment in the cache 118. The memory 108 further includes a free extent pool 120 indicating extents 114 of tracks in the storage 106 that are not yet assigned to a volume 112 and available to be assigned to a volume 112 for use.

The memory 108 includes a threat monitor program 122 that creates trap storage units, such as volumes and extents, as a honeypot to detect potentially malicious activity from a potentially malicious process in a host $102_i$ having malicious code, such as a virus, ransomware, etc. If a process in a host $102_i$ attempts a certain type of access to a trap volume and/or trap extent, then such access would be considered potentially malicious and notification would be provided to the host system $102_i$ to alert the host of a potentially malicious process making a potentially malicious request. The host system $102_i$ may then take action to isolate or quarantine the potentially malicious process to avoid further harm.

The storage manager 110, cache manager 116, and threat monitor program 122 are shown in FIG. 1 as program code loaded into the memory 108 and executed by one or more of the processors 107. Alternatively, some or all of the functions may be implemented as microcode or firmware in hardware devices in the system 100, such as in Application Specific Integrated Circuits (ASICs).

The storage 106 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise a suitable volatile or non-volatile memory devices, including those described above.

Figure 2:
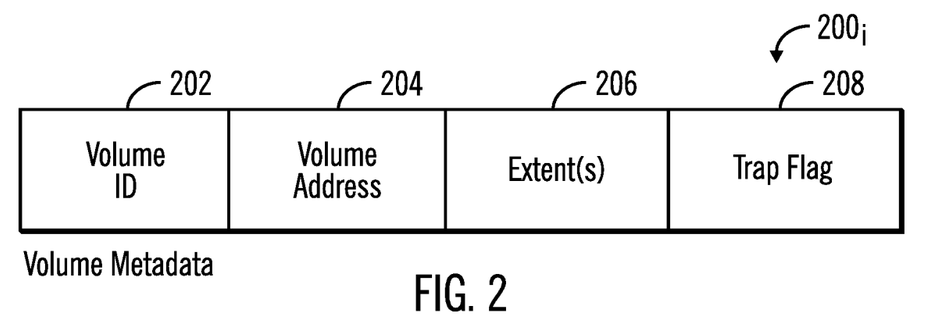
FIG. 2 illustrates an embodiment of volume metadata for a volume configured in a storage.

FIG. 2 illustrates an embodiment of an instance of volume metadata $200_i$ for one of the volumes 112, and includes, but not limited to, a volume identifier (ID) 202; a volume address 204 assigned to the volume 202 that host systems $102_1, 102_2 \ldots 102_n$ use to access the volume 202; one or more extents 206 allocated to the volume 202; and a trap flag 208 indicating whether the volume comprises a volume created by a host $102_i$ or a trap volume created by the threat monitor program 122 as a honeypot to detect malicious processes.

Figure 3:
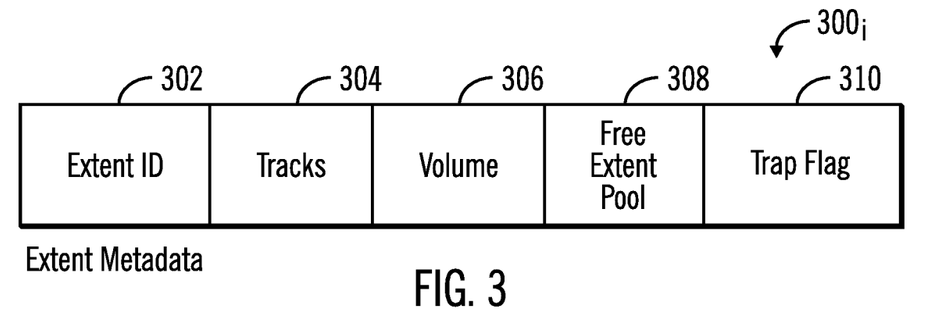
FIG. 3 illustrates an embodiment of extent metadata for an extent to allocate to a volume.

FIG. 3 illustrates an embodiment of an instance of extent metadata $300_i$ for an extent 114, and includes, but not limited to, an extent (ID) 302; tracks 304 included in the extent, which may comprise a range of consecutive tracks; a volume 306 to which the extent is allocated if it is allocated to a volume; a free extent pool 308 to which the extent is assigned if the extent is indicated in a free extent pool 308 as available to assign to a volume 112; and a trap flag 310 indicating whether the extent 302 was added to provide tracks in a volume created by a host $102_i$ or a trap extent created by the threat monitor program 122 as a honeypot to detect malicious processes.

Figure 4:
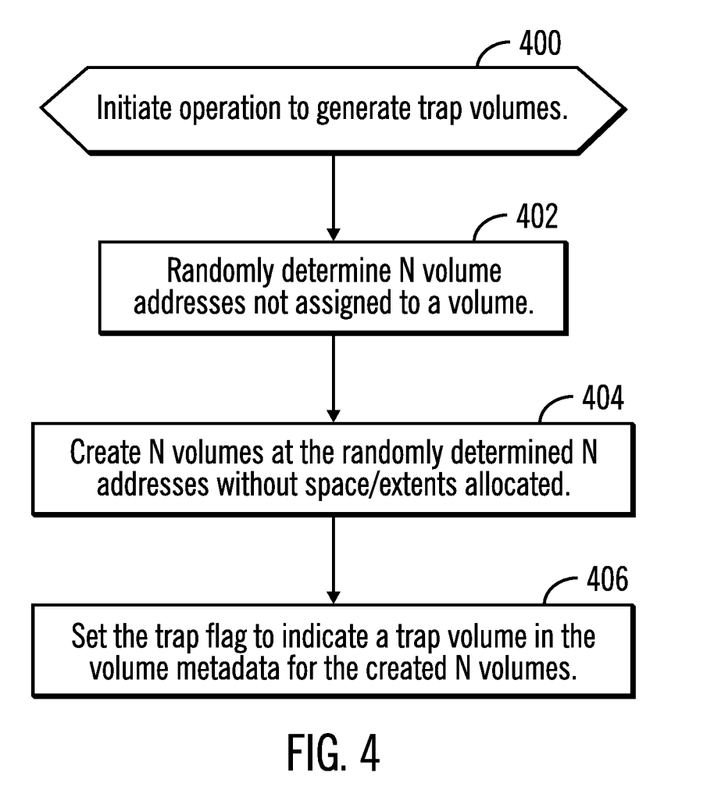
FIG. 4 illustrates an embodiment of operations to generate trap volumes to detect potentially malicious processes.

FIG. 4 illustrates an embodiment of operations performed by the threat monitor program 122 to generate trap volumes 112, which may be performed during storage controller 100 initialization or runtime operations pursuant to predefined settings or initiated by an administrator. Upon initiating (at block 400) the operation, the threat monitor program 122 randomly determines (at block 402) N volume addresses not assigned to a volume 112 and creates (at block 404) N volumes at the randomly determined N addresses without space/extents allocated. The trap flag 208 is set (at block 406) to indicate the volume is a trap volume.

With the embodiment of FIG. 4, the threat monitor program 122 may create trap volumes $112_F$ not created by a host system $102_i$. No legitimate authorized process executing in the host system $102_i$ would try to access such a trap volume $112_F$ because legitimate processes would only access the volumes the host system $102_i$ would have created for use by legitimate, non-trap, processes requesting space from the host. However, malicious processes could learn of the allocation of the trap volumes $112_F$ and would access for malicious purposes. In this way, the threat monitor program 122 is creating trap volumes $112_F$ to identify malicious processes, because legitimate processes would not intentionally access a trap volume $112_F$ unless there was some code error, system error or bug.

Figure 5:
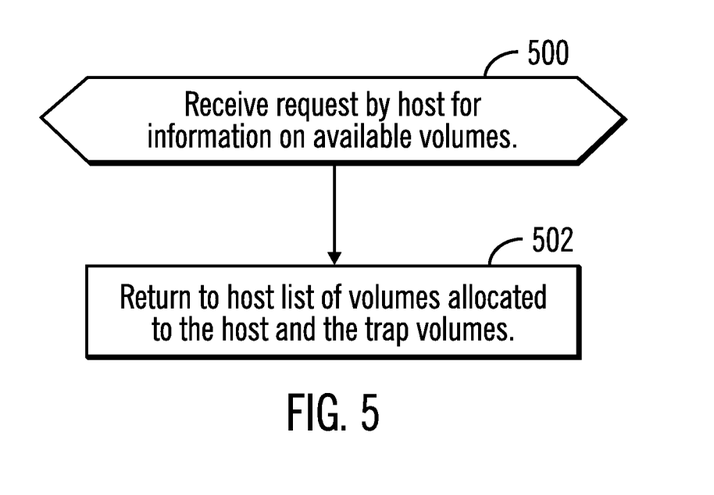
FIG. 5 illustrates an embodiment of operations to return information to a host on trap volumes.

FIG. 5 illustrates an embodiment of operations performed by the storage manager 110 to process a discovery request from a host system $102_i$ for available volumes. In response to a request (at block 500) from a host system $102_i$, the storage manager 110 returns (at block 502) a list of volumes allocated for the host $102_i$ and the trap volumes $112_F$, which were not created by the host $102_i$. Malicious processes would see the discovered trap volumes $112_F$ and attempt to access, whereas legitimate processes in a host $102_i$ would only access those volumes 112 that were allocated through the host system $102_i$.

Figure 6:
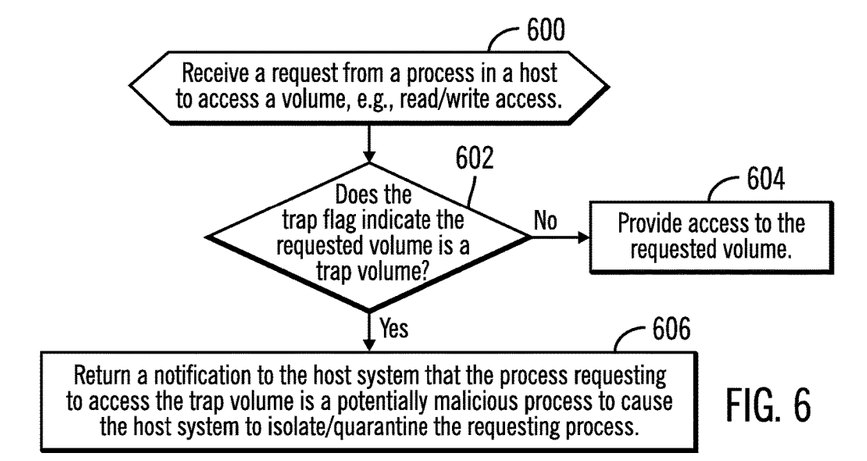
FIG. 6 illustrates an embodiment of operations to process a read request to a volume when the volume is trap or not trap.

FIG. 6 illustrates an embodiment of operations performed by the storage manager 110 or threat monitor program 122 to process a request from a host $102_i$ to access, e.g., read/write, to a volume 112. If (at block 602) the trap flag 208 indicates the requested volume is not a trap volume, then the storage manager 110 provides access (at block 604) to the requested volume 112. If (at block 602) the volume is a trap volume, then the storage manager 110 returns (at block 606) a notification to the host system $102_i$ that the process requesting to access the trap volume $112_F$ is a potentially malicious process to cause the host system to isolate/quarantine the requesting process.

Figure 7:
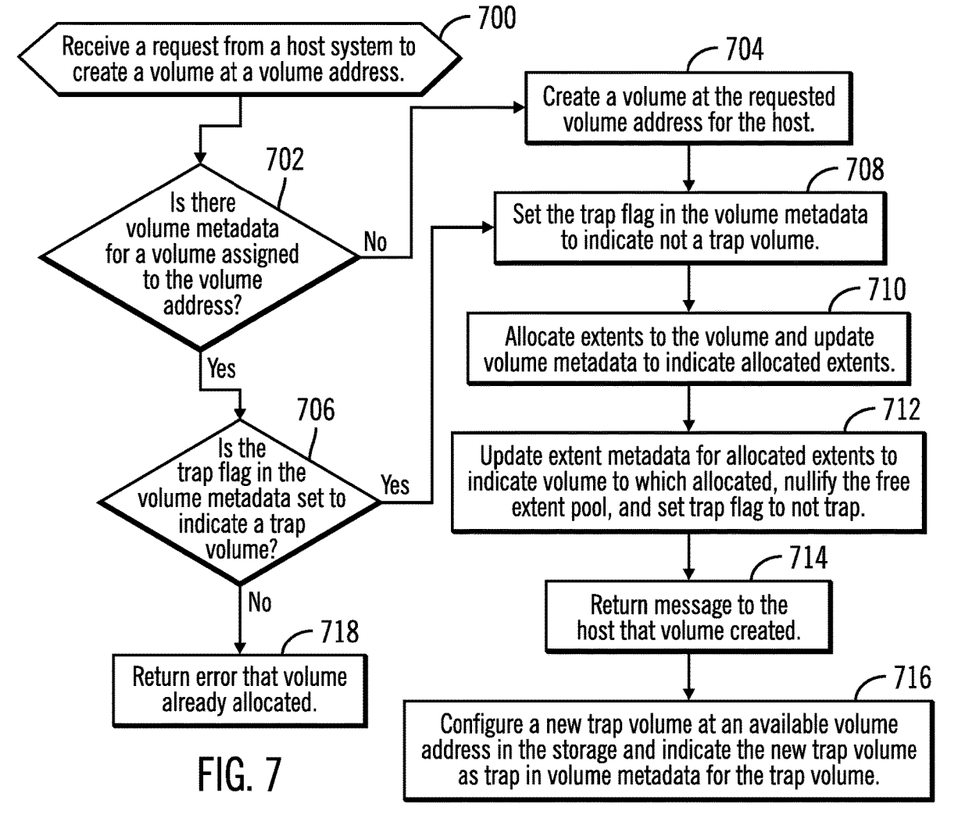
FIG. 7 illustrates an embodiment of operations to process a request to create a volume.

FIG. 7 illustrates an embodiment of operations performed by the storage manager 110 to process a request from a host system $102_i$ to create a volume 112 at a volume address. Upon receiving (at block 700) a request from a host $102_i$ to create a volume 112 at a volume address, if (at block 702) there is no volume metadata $200_i$ for a volume assigned the requested volume address, then the storage manager 110 creates (at block 704) the volume 112 at the requested volume address, by creating volume metadata $200_i$ and assigning extents 114 to the volume 112. If (at block 702) there is volume metadata $200_i$ for a volume 202 assigned to the requested volume address 204 and the trap flag 208 indicates (at block 706) the volume is trap, then since a legitimate request from a host $102_i$ is made for that volume address, the trap flag 208 in the volume metadata $200_F$ for the trap volume $112_F$ is set (at block 708) to indicate not a trap volume to convert the trap volume to a legitimate, non-trap volume for use. Extents 114 are allocated (at block 710) to the volume 112, and the allocated extents are indicated in extents 206 in the volume metadata 200. The extent metadata $300_i$ for the allocated extents is updated (at block 712) to indicate the volume 306 to which the extent 302 is allocated, nullify the free extent pool 120 indicated in the free extent pool 308, and set the trap flag 310 to indicate the extent is not a trap extent. A message is returned (at block 714) to the host $102_i$ indicating the volume 112 at the requested volume address was created. The storage manager 110 or threat monitor program 122 may configure (at block 716) a new trap volume 112 at an available volume address in the storage 106 and indicate the new trap volume as trap 208 in volume metadata $200_F$ settings for the new trap volume.

After configuring a volume 112 (at block 704), control proceeds to block 708 et seq. to continue creating the volume and allocating extents. If (at block 706) the trap flag to the requested volume does not indicate a trap, then an error is returned (at block 718) that the volume is already allocated.

With the embodiment of FIG. 7, if a requested volume address is assigned to a trap volume 112, then that trap volume 112 is converted to a legitimate volume by updating the volume metadata $200_i$ for the trap volume to indicate it is not a trap so the host system $102_i$ request to create a volume at the requested volume address may be satisfied. Further, to maintain the same number of N trap volumes, the threat monitor program 122 or storage manager 110 may create a new trap volume to replace the trap volume converted to a legitimate volume to maintain the same number of trap or honeypot volumes to detect malicious processes and activity. This maintains the number of volumes used to lure malicious processes to maintain the detection capability of the predetermined number of volumes to set as trap.

Figure 8:
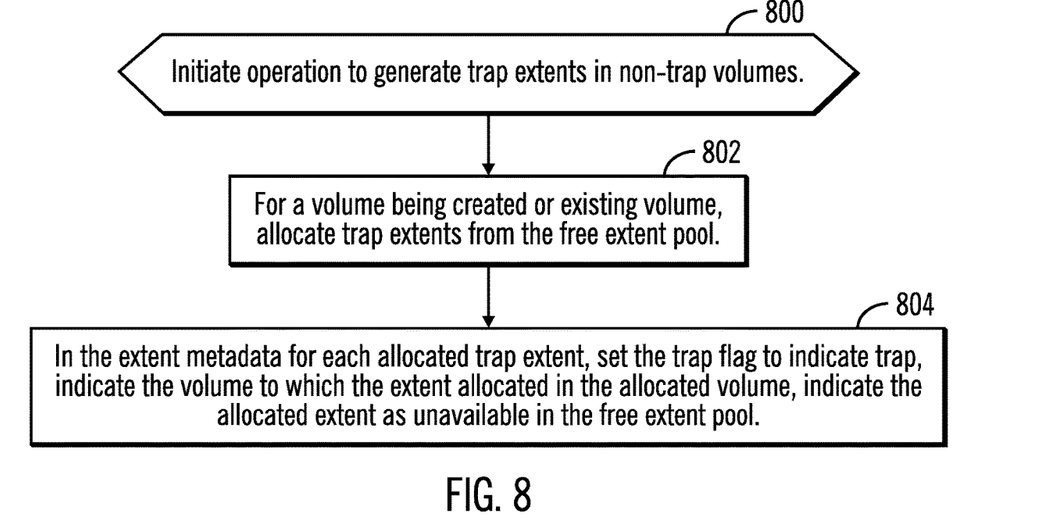
FIG. 8 illustrates an embodiment of operations to generate trap extents in non-trap volumes to detect potentially malicious processes.

FIG. 8 illustrates an embodiment of operations performed by the threat monitor program 122 and/or storage manager 110 to generate trap extents 114, which may be performed when creating a real, not trap, volume 112 to detect malicious activity within a legitimately created volume. Upon initiating (at block 800) an operation to generate trap extents 114, for a volume 112 being created or existing volume 112, the threat monitor program 122 allocates (at block 802) trap extents from the free extent pool 120. The threat monitor program 122/storage manager 110 updates (at block 804) the extent metadata $300_F$ for each allocated trap extent to set the trap flag 310 to indicate trap, indicate the volume to which the trap extent is allocated in the allocated volume 306, and indicate the allocated extent as unavailable in the free extent pool 308.

With the embodiment of FIG. 8, the threat monitor program 122 may create trap extents 114 not assigned for host storage needs. No legitimate authorized process executing in the host system $102_i$ would try to read such a trap extent $114_F$, because a legitimate process would only be provided information on extents legitimately allocated by the storage manager 110, not extents never allocated in response to a request from a legitimate process through the normal channels. However, malicious processes could learn of the allocation of the trap extents $114_F$ and would read for malicious purposes. In this way, the threat monitor program 122 is creating trap extents $114_F$ to identify malicious processes, because legitimate processes would not intentionally read a trap extent $114_F$ unless there was some code error, system error or bug.

Figure 9:
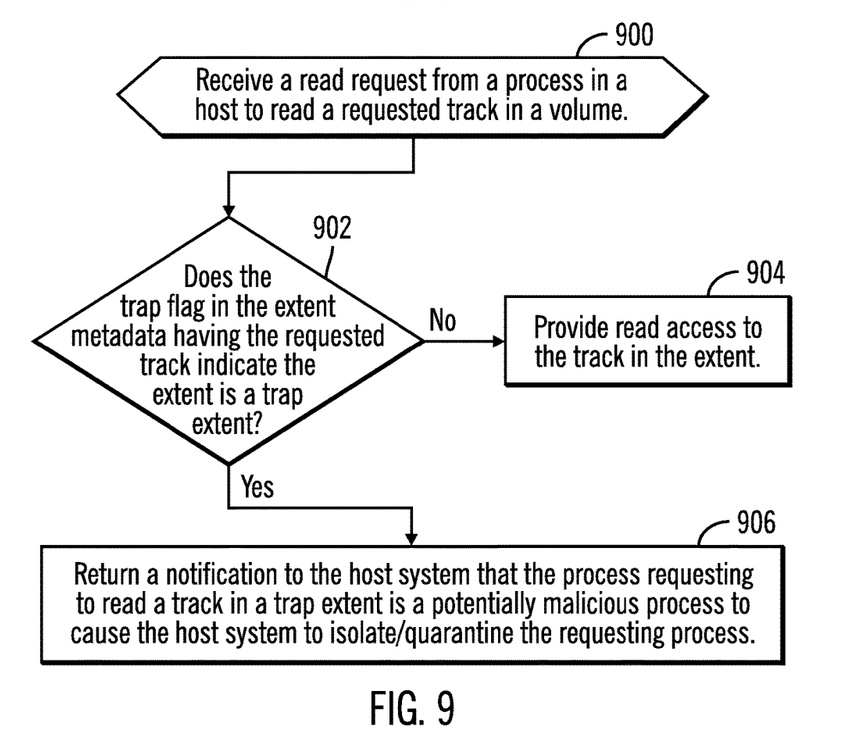
FIG. 9 illustrates an embodiment of operations to process a read request to a track in an extent when the extent is trap or not trap.

FIG. 9 illustrates an embodiment of operations performed by the storage manager 110 and/or threat monitor program 122 to process a read request from a host system $102_i$ to read a requested track in an extent 114 of a volume 112. Upon receiving (at block 900) the read request, the storage manager 110 determines (at block 902) from the trap flag 310 in the extent metadata $300_i$ of the extent 114 including the requested track whether the extent 114 is a trap extent. If not, then the storage manager 110 provides (at block 904) read access to the track in the extent. If (at block 902) the extent 114 is a trap extent, then the storage manager 110 returns (at block 906) a notification to the host system $102_i$ that the process requesting to access the trap extent $114_F$ is a potentially malicious process to cause the host system to isolate/quarantine the requesting process.

Figure 10:
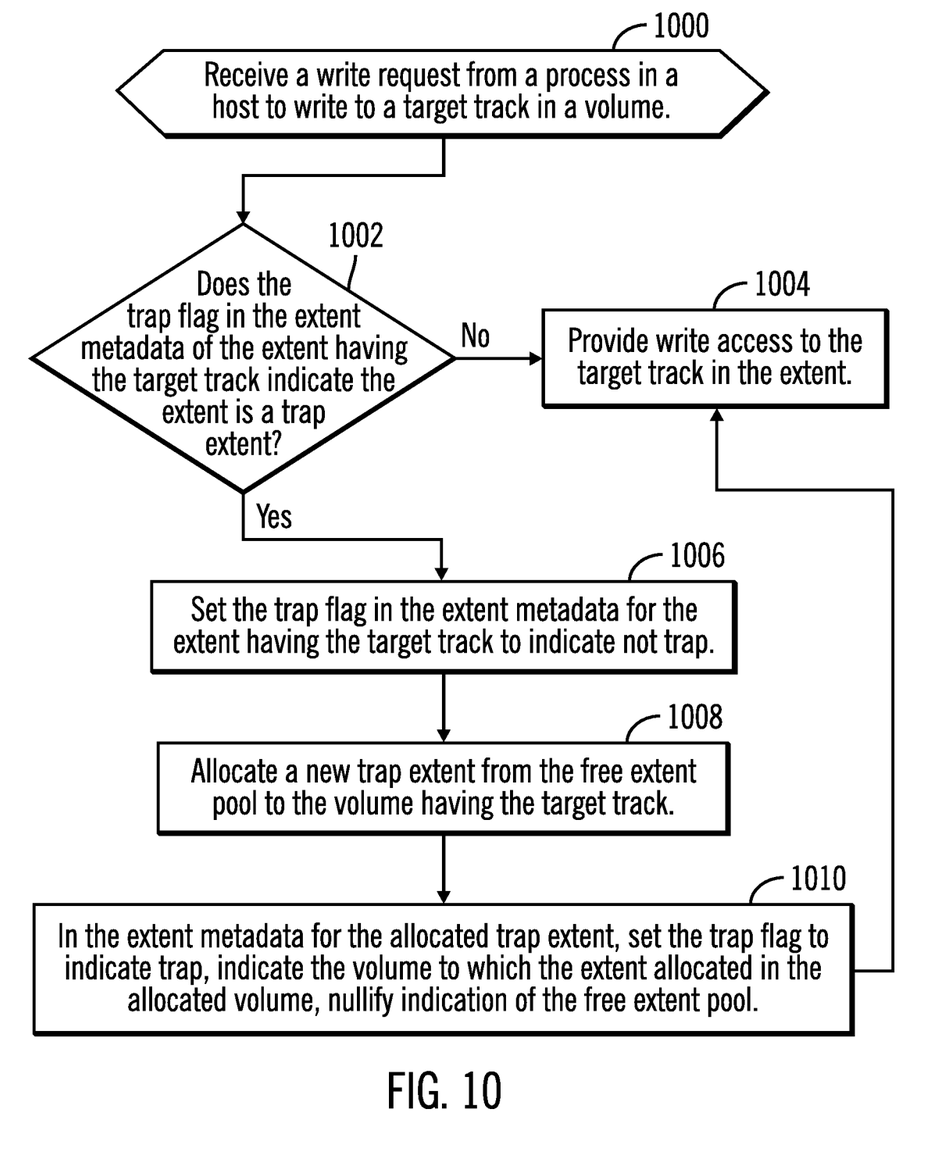
FIG. 10 illustrates an embodiment of operations to process a write request to a target track when the extent is trap or not trap.

FIG. 10 illustrates an embodiment of operations performed by the storage manager 110 and/or threat monitor program 122 to process a write request from a process in a host system $102_i$ to write to a target track in an extent 114 of a volume 112. Upon receiving (at block 1000) the write request, the storage manager 110 determines (at block 1002) from the trap flag 310 in the extent metadata $300_i$ of the extent including the target track whether the extent is a trap extent. If not, then the storage manager 110 provides (at block 1004) write access to the target track in the extent. If (at block 1002) the extent 114 is a trap, then the storage manager 110 sets (at block 1006) the trap flag 310 in the extent metadata $300_i$ for the trap extent $114_F$ having the target track to indicate the extent is not trap, i.e., convert the extent to not trap. The storage manager 110 allocates (at block 1008) a new trap extent from the free extent pool 120 to the volume 112 having the target track. In the extent metadata $300_i$ for the newly allocated trap extent $114_F$, the storage manager 110 sets (at block 1010) the trap flag 310 to indicate a trap, indicate the volume 112 having the target track to which the extent allocated in the allocated volume 306, and nullify indication of the allocated extent in the free extent pool 120.

The embodiment of FIGS. 9 and 10 address the situation where certain types of access would only be from a legitimate, non-malicious process, and other types of access would be malicious. For instance, only a malicious process would attempt to read from a trap extent because a legitimate process would only be allocated tracks from an extent allocated by the storage manager 110 for a host system request and, thus, a legitimate process would not attempt to read an extent 114 that was not previously allocated for host activity. For this reason, read access to a trap extent $114_F$ is presumed to be from a malicious process. However, a write request may be from a legitimate process seeking to write additional data to the volume 112 and may see a trap extent $114_F$ configured for the volume and then attempt to write to that extent. For this reason, for a write request, the process is assumed to be legitimate, i.e., not malicious, so the extent 114 is converted to a not trap extent that may be used in the volume 112. Further to maintain the preconfigured ratio of trap honeypot extents in the volume 112, a new trap extent is created to be available to lure and detect malicious processes to replace the trap extent converted to a legitimate extent for host access.

Described embodiments concern trap storage units, such as trap volumes and trap extents, to lure and detect malicious processes. In further embodiments, other trap storage units, in addition to volumes and extents, may be created to lure malicious processes. In such case, upon receiving a request to access a trap storage unit, a notification is returned to the host system that the process requesting to access the trap storage unit is potentially malicious. Further, a trap storage unit may not be provisioned storage space in the storage. In further embodiments, if the type of request to access the trap storage unit is not potentially malicious, then the trap storage unit, accessed in such non-malicious manner, may be indicated as not trap to convert to a legitimate storage unit. New trap storage units may be configured in response to converting a trap storage unit to not trap to maintain the ratio of trap storage units available to lure malicious processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
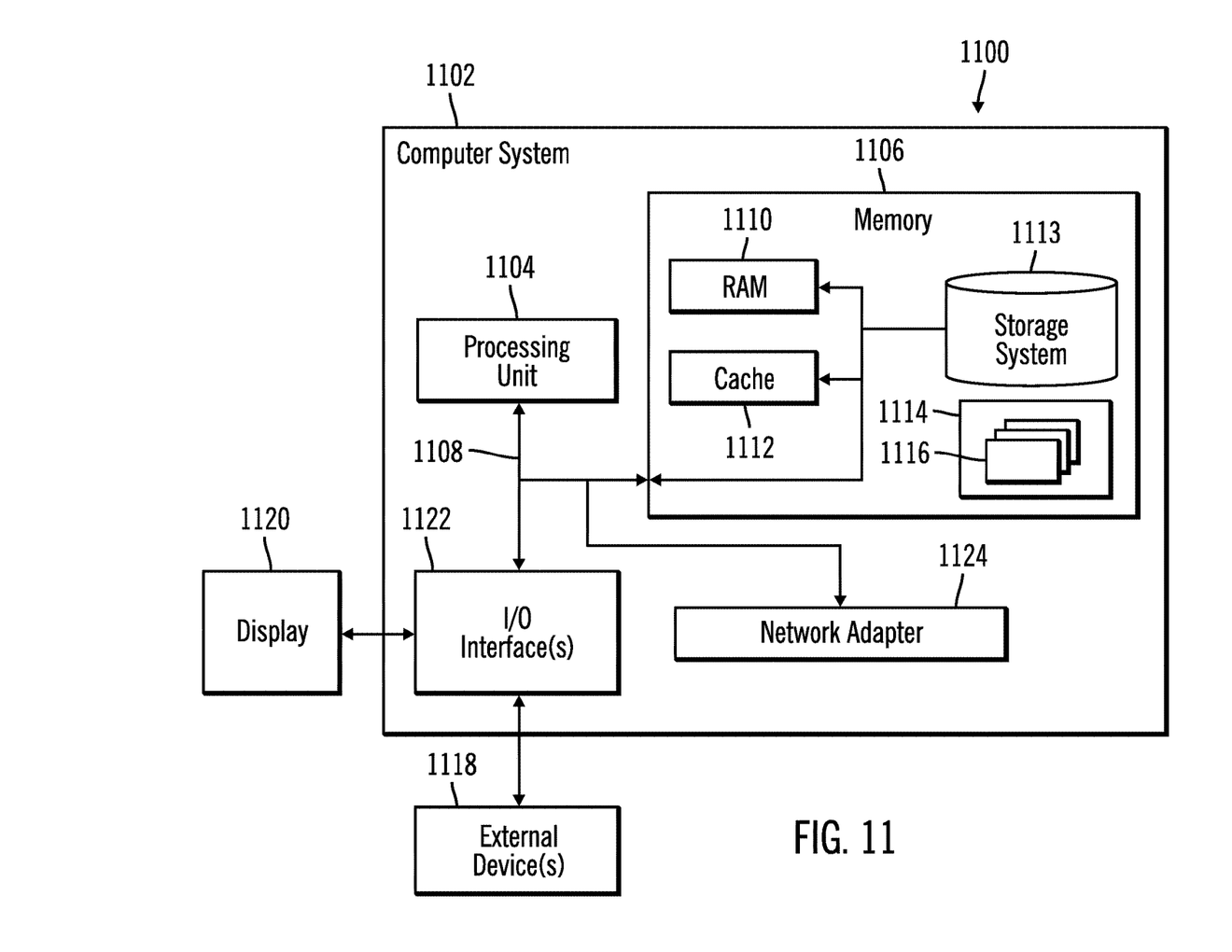
FIG. 11 illustrates a computing environment in which the components of FIG. 1 may be implemented

The computational components of FIG. 1, including the storage controller 100 and host systems $102_1, 102_2 \ldots 102_n$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting potentially malicious code accessing data from a storage including storage units configured in the storage and in communication with host systems, the computer program product comprising a computer readable storage medium having computer readable program code embodied therein that when executed performs operations, the operations comprising:

configuring a trap storage unit for data in the storage;
indicating the trap storage unit as a trap;

configuring a storage unit for data in the storage that is indicated as not a trap;
configuring a trap extent in the storage unit for data in the storage that is indicated as not a trap; wherein the trap extent is indicated as a trap;
receiving a request to access the trap storage unit or the trap extent from a process executing in a host system; and
returning a notification to the host system of the process requesting to access the trap storage unit or the trap extent as a potentially malicious process.

2. The computer program product of claim 1, wherein the computer program product is implemented in a storage controller managing access to the storage, wherein the trap storage unit is created by a process in the storage controller and not in response to a request for a storage unit from one of the host systems.

3. The computer program product of claim 1, wherein the trap storage unit is not provisioned storage space in the storage.

4. The computer program product of claim 1, wherein the operations further comprise:
receiving a request to access the trap storage unit that is not potentially malicious; and
indicating the trap storage unit accessed in a manner that is not potentially malicious as not a trap.

5. The computer program product of claim 4, wherein the operations further comprise:
configuring a new trap storage unit and indicating the new trap storage unit as a trap in response to the request to the trap storage unit that is not potentially malicious.

6. The computer program product of claim 1, wherein the operations further comprise:
receiving a write to the trap extent from a host;
allocating the trap extent to a volume for the host to use by indicating the trap extent as nota trap; and
configuring a new trap extent in the volume and indicating the new trap extent as a trap in extent metadata for the new trap extent.

7. The computer program product of claim 6, wherein a request to access the trap extent that causes returning notification that the process requesting to access the trap extent is a potentially malicious process comprises a read request.

8. The computer program product of claim 1, wherein the operations further comprise:
creating a plurality of trap extents to allocate to a volume; and
indicating in extent metadata for the created trap extents that the created trap extents are traps.

9. A computer program product for detecting potentially malicious code accessing data from a storage and in communication with host systems, the computer program product comprising a computer readable storage medium having computer readable program code embodied therein that when executed performs operations, the operations comprising:
configuring a trap volume for data in the storage, wherein the trap volume has a volume address that the host systems use to access tracks allocated to the trap volume;
indicating the trap volume as a trap;
configuring volumes in the storage that are not indicated as a trap, wherein each volume of the volumes has a volume address the host systems use to access tracks allocated to the volume;
receiving a request to access the trap volume from a process executing in a host system; and
returning a notification to the host system of the process requesting to access the trap volume as a potentially malicious process.

10. The computer program product of claim 9, wherein the trap volume is assigned a volume address, wherein the operations further comprise:
randomly determining volume addresses; and
creating trap volumes at the randomly determined volume addresses and indicating the trap volumes as traps in volume metadata.

11. The computer program product of claim 9, wherein the trap volume is assigned a volume address, wherein the operations further comprise:
receiving a request from a host to create a new volume at a requested volume address assigned to a trap volume;
indicating the trap volume assigned the requested volume address as nota trap in volume metadata for the trap volume rendering the trap volume a new volume that is nota trap;
provisioning storage space to the new volume; and
returning indication to the request from the host that the new volume at the requested volume address is configured for use.

12. The computer program product of claim 11, wherein the operations further comprise:
configuring a new trap volume at an available volume address in the storage and indicating the new trap volume as a trap volume in volume metadata for the new trap volume.

13. A system for detecting potentially malicious code accessing data from a storage including storage units configured in the storage and in communication with host systems, comprising:
a processor; and
a computer readable storage medium having computer readable program code embodied therein that when executed performs operations, the operations comprising:
configuring a trap storage unit for data in the storage;
indicating the trap storage unit as a trap;
configuring a storage unit for data in the storage that is indicated as not a trap;
configuring a trap extent in the storage unit for data in the storage that is indicated as not a trap; wherein the trap extent is indicated as a trap;
receiving a request to access the trap storage unit or the trap extent from a process executing in a host system; and
returning a notification to the host system of the process requesting to access the trap storage unit or the trap extent as a potentially malicious process.

14. The system of claim 13, wherein the operations further comprise:
receiving a request to access the trap storage unit that is not potentially malicious; and
indicating the trap storage unit accessed in a manner that is not potentially malicious as not a trap.

15. The system of claim 14, wherein the operations further comprise:
configuring a new trap storage and indicating the new trap storage unit as a trap in response to the request to the trap storage unit that is not potentially malicious.

16. The system of claim 13, wherein the operations further comprise:
receiving a write to the trap extent from a host;

allocating the trap extent to a volume for the host to use by indicating the trap extent as nota trap; and configuring a new trap extent in the volume and indicating the new trap extent as a trap in extent metadata for the new trap extent.

17. The system of claim 13, wherein the operations further comprise:

creating a plurality of trap extents to allocate to a volume; and indicating in extent metadata for the created trap extents that the created trap extents are traps.

18. A system for detecting potentially malicious code accessing data from a storage and in communication with host systems, comprising:

a processor; and a computer readable storage medium having computer readable program code embodied therein that when executed performs operations, the operations comprising:

configuring a trap volume for data in the storage, wherein the trap volume has a volume address that the host systems use to access tracks allocated to the trap volume;

indicating the trap volume as a trap;

configuring volumes in the storage that are not indicated as a trap, wherein each volume of the volumes has a volume address the host systems use to access tracks allocated to the volume;

receiving a request to access the trap volume from a process executing in a host system; and returning a notification to the host system of the process requesting to access the trap volume as a potentially malicious process.

19. The system of claim 18, wherein the trap volume is assigned a volume address, wherein the operations further comprise:

randomly determining volume addresses; and creating trap volumes at the randomly determined volume addresses and indicating the trap volumes as traps in volume metadata.

20. The system of claim 18, wherein the trap volume is assigned a volume address, wherein the operations further comprise:

receiving a request from a host to create a new volume at a requested volume address assigned to a trap volume;

indicating the trap volume assigned the requested volume address as nota trap in volume metadata for the trap volume rendering the trap volume a new volume that is nota trap;

provisioning storage space to the new volume; and returning indication to the request from the host that the new volume at the requested volume address is configured for use.

21. A method for detecting potentially malicious code accessing data from a storage including storage units configured in the storage comprising:

configuring a trap storage unit for data in the storage;

indicating the trap storage unit as a trap;

configuring a storage unit for data in the storage that is indicated as not a trap;

configuring a trap extent in the storage unit for data in the storage that is indicated as not a trap; wherein the trap extent is indicated as a trap;

receiving a request to access the trap storage unit or the trap extent from a process executing in a host system; and returning a notification to the host system of the process requesting to access the trap storage unit or the trap extent as a potentially malicious process.

22. The method of claim 21, further comprising:

receiving a request to access the trap storage unit that is not potentially malicious; and indicating the trap storage unit accessed in a manner that is not potentially malicious as not a trap.

23. The method of claim 22, further comprising:

configuring a new trap storage and indicating the new trap storage unit as a trap in response to the request to the trap storage unit that is not potentially malicious.

24. The method of claim 21, further comprising:

receiving a write to the trap extent from a host;

allocating the trap extent to a volume for the host to use by indicating the trap extent as nota trap; and configuring a new trap extent in the volume and indicating the new trap extent as a trap in extent metadata for the new trap extent.

25. The method of claim 21, further comprising:

creating a plurality of trap extents to allocate to a volume; and indicating in extent metadata for the created trap extents that the created trap extents are traps.

* * * * *